Dec. 26, 1967   J. R. MARTIN ET AL   3,359,599
LINER FLARING APPARATUS
Filed May 6, 1964    2 Sheets-Sheet 1
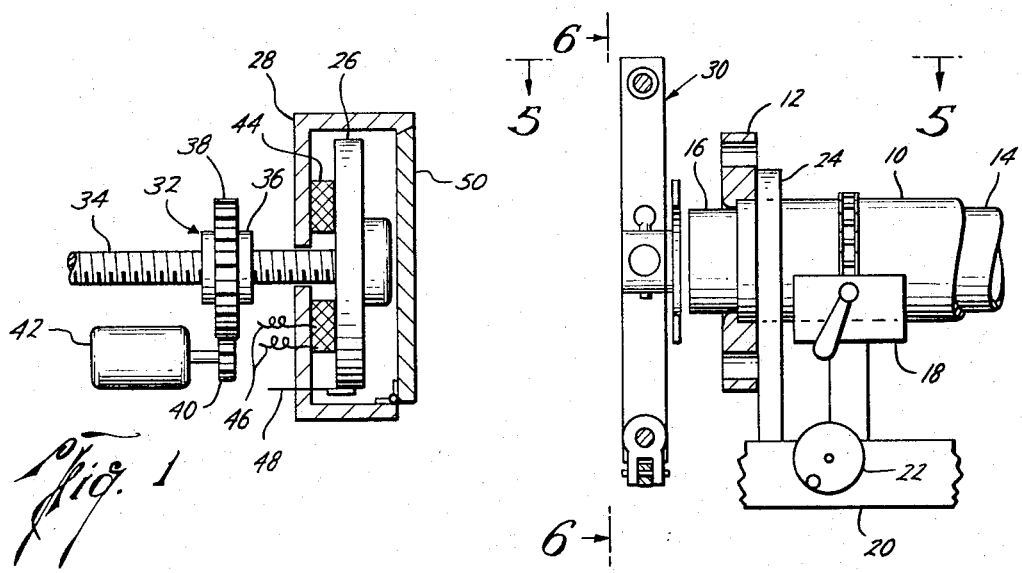
Fig. 1
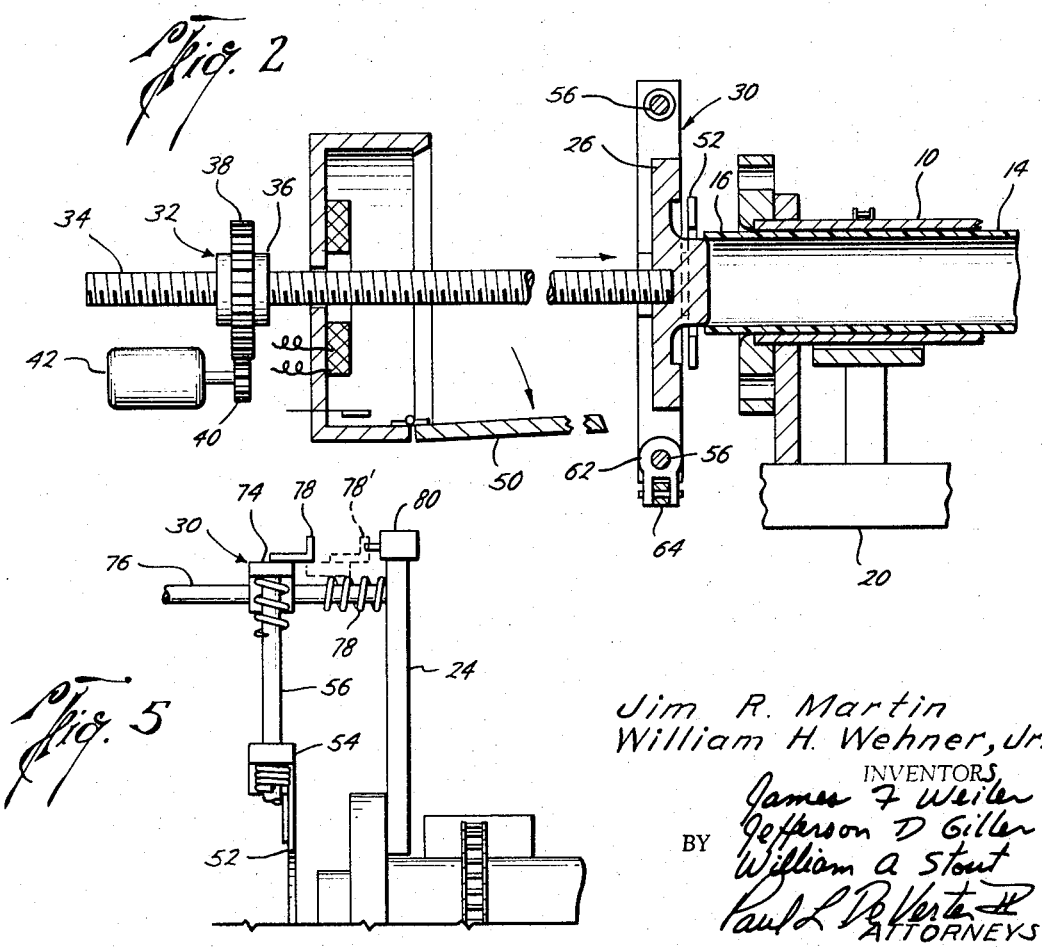
Fig. 2
Fig. 5
Jim R. Martin
William H. Wehner, Jr.
INVENTORS
BY
James F Weiler
Jefferson D Giller
William A Stout
Paul L DeVerter II
ATTORNEYS Dec. 26, 1967  J. R. MARTIN ET AL  3,359,599
LINER FLARING APPARATUS
Filed May 6, 1964  2 Sheets-Sheet 2
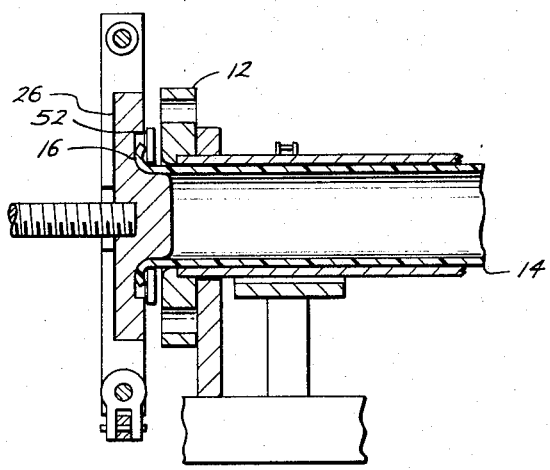
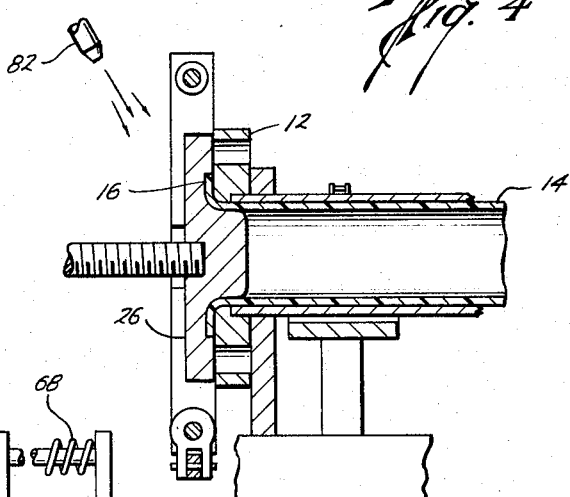
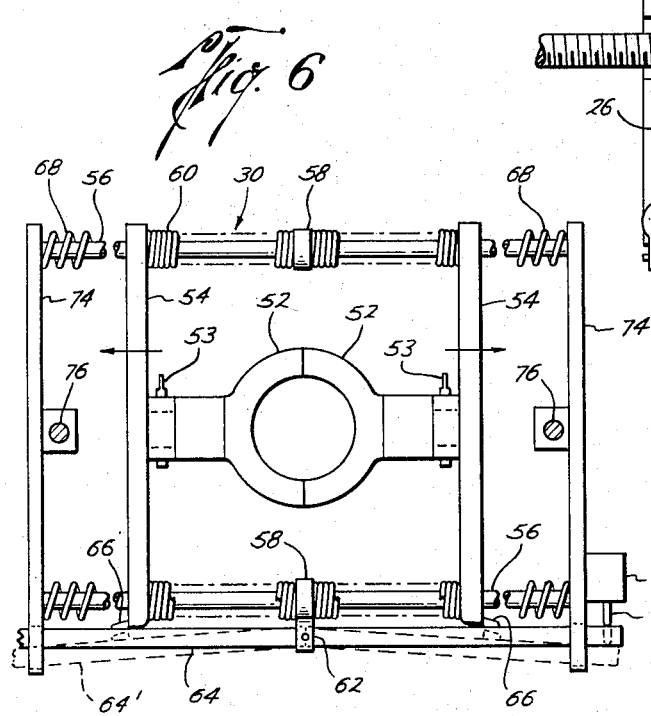
Jim R. Martin
William H. Wehner, Jr.
INVENTORS
James F. Weiler
Jefferson D. Giller
William A. Stout
Paul L. DeVerter
BY
ATTORNEYS United States Patent Office 3,359,599
Patented Dec. 26, 1967

3,359,599
LINER FLARING APPARATUS
Jim R. Martin and William H. Wehner, Jr., Houston, Tex., assignors to John L. Doré Co., Houston, Tex., a corporation of Texas
Filed May 6, 1964, Ser. No. 365,252
4 Claims. (Cl. 18—19)

ABSTRACT OF THE DISCLOSURE

A liner flaring apparatus which is utilized to prevent back curling of a thermoplastic pipe liner as a flared flange is formed on the liner, by providing removable ears which encircle the liner and move forward with the mandrel as the flaring proceeds. The ears hold the flared portion of the liner adjacent the mandrel, and the ears are removed as the mandrel approaches the pipe flange.

---

The present invention relates to a liner flaring apparatus, and more particularly relates to an apparatus for forming a flared flange on a thermoplastic liner for a pipe, or other conduit, and for preventing the liner being flared from back curling.

As is well known in the pipe lining field, flanges are formed on thermoplastic pipe liners by pressing a heated mandrel against an extension of the liner, thus causing the thermoplastic liner to flow and be enlarged into a flange adjacent the conduit flange. After the mandrel has cooled and the flared liner has set, the mandrel may be removed, thus completing the operation. Patented examples of such devices seen in De Vecchi, No. 3,047,937; Gray, No. 3,042,965; and St. John, No. 3,030,253.

In spite of the best efforts of the prior art devices, when the heated mandrel is pushed against the liner extension, the liner tends to curl over upon itself, a phenomenon known as back curing. The present invention is particularly directed toward an apparatus to prevent this back curling.

To prevent this back curling, the present invention utilizes a pair of ears which are inserted about the liner extension between the mandrel and the pipe or conduit flange and so arranged as to hold the flaring liner against the mandrel until the mandrel has advanced sufficiently close to the flange, whereupon the ears are removed from between the mandrel and flange.

Thus, it is an object of the present invention to provide a liner flaring apparatus which includes removable back curl preventing ears.

Yet another object of the present invention is to provide a liner flaring apparatus which includes means for automatically removing the back curl preventing ears when the mandrel has approached within a predetermined distance of the pipe flange.

Other and further objects, features and advantages will be apparent from the following description of the presently preferred embodiment of the invention, given for the purpose of disclosure, taken in conjunction with the accompanying drawings, where like character references designate like parts throughout the several views, and where:

FIGURE 1 is a partial sectional side view showing the mandrel within the oven,

FIGURE 2 is a view similar to FIGURE 1 showing the mandrel as it first contacts the liner extension, FIGURE 3 is another similar view showing the ears of the present invention preventing back curling, FIGURE 4 is another similar view showing the final pressing of the liner flange, FIGURE 5 is a partial top view taken along the line 5—5 of FIGURE 1 showing the conduit vice and back curl preventing mechanism, and FIGURE 6 is a front view taken along the line 6—6 of FIGURE 1 showing the back curl preventing mechanism.

Generally, the apparatus of the invention comprises a back curl preventing mechanism which is utilized in conjunction with a heatable mandrel to flare a conduit liner.

Referring now to the drawings, and particularly FIGURE 1, reference numeral 10 generally designates a pipe or conduit having a pipe flange 12 appropriately mounted thereon, as by welding. Mounted within the conduit 10 is the thermoplastic liner 14 which has an extension 16 extending beyond the flange 12. It is the function of this flaring apparatus to flare the extension 16 so that the extenison is expanded and fits against the flange 12. Therefore, when two similar conduits are joined together by means of the flange 12, fluid carried within the liner 14 may not contact the flange 12 or conduit 10.

The conduit 10 is held stationary by the pipe vice 18 which is in turn mounted to the frame 20 through adjustment means 22. The flange 12 of the conduit 10 is butted against the yoke 24, which is also attached to the frame 20. Opposite the extension 16 of the liner 14 is the flaring mandrel 26 shown within the oven 28. It is to be noted that the flaring mandrel 26 is mounted coaxially with the conduit 10, this alignment being secured by the adjusting means 22. Situated between the mandrel 26 and the extension 16 is the flaring ear assembly 30, hereinafter more fully described.

The mandrel 26 is mounted on the advancing means 32, here shown as comprising a lead screw 34 attached to the mandrel 26, a rotating nut 36 appropriately fastened to gear 38, which is in turn meshed with gear 40, which is in turn rotatable by the motor 42. It is to be understood that the advancing means 32 may be replaced by any other conventional apparatus.

As shown in FIGURE 1, the mandrel 26 is held against the heater 44 which is energized by the conductors 46 until the mandrel 26 has reached a predetermined temperature as indicated by the indicating means 48, here shown as a thermocouple. For example, if the liner 14 is made of FEP Teflon (Du Pont's brand of thermoplastic polytetrafluoroethylene) then the mandrel would be heated to a temperature of approximately 500° F. After the mandrel 26 has reached the pre-determined temperature, the door 50 of the oven 28 is opened, as indicated in FIGURE 2 by the arrow.

Upon opening the door 50, as shown in FIGURE 2, the advancing means 32 is energized, thereby advancing the mandrel 26 toward the extension 16 of the liner 14. This advancement of the mandrel 26 may be accomplished by energizing the motor 42 which in turn rotates the gears 40 and 38 thereby rotating the nut 36 which advances the lead screw 34, so that the mandrel 26 advances coaxially upon the conduit 10 and the liner 14, as well as the extension 16 thereof. It is to be particularly noted that a portion of the flaring ear assembly 30 is situated between the mandrel 26 and the extension 16.

Referring now to FIGURE 6, it is seen that the flaring ear assembly 30 generally includes a pair of ears 52 whose outer ends are shown butted together. The ears in turn are detachably mounted on the slides 54 by the attachment means 53. The slides 54 are slibably mounted on the horizontal guides 56 so that the ears 52 may be moved laterally away from their butted position in the direction of the arrows.

Mounted on each guide 56 is a collar 58 and pressing against the collar 58 and the slide 54 is a spring 60 whose function is to normally move each ear 52 in the direction of the arrow. Also attached to the lower collar 58 is a pivot assembly 62 to which is pivotally attached a stop bar 64. Mounted on the stop bar 64 is a dog 66 which engages the slide 54 when the stop bar 64 is in the position shown in full lines in FIGURE 6. However, when the stop bar 64 is pivoted downwardly, as shown in dotted lines as 64′ in FIGURE 6, then the dog 66 does not engage the slide 54, hence the slide 54 is pushed outwardly by the spring 60 so that the ears 52 no longer butt. Upon release of the slide 54 by the pivoting of the stop bar 64, the springs 68 absorb the shock of sudden movement of the guides. Pivotal movement of the stop bar 64 is controlled by the solenoid 70, which upon being energized extends its plunger 72 downwardly, thereby pivoting the stop bar 64 downwardly, thus allowing the dog 66 to release the slide 54, as described.

It is to be particularly noted that the ears 52 when butted form a circle whose inner diameter is just slightly greater than that of the extension 16 of the liner 14. Thus, when different size pipes or conduits 10 are utilized with various size liners 14, then through the attachment means 53, appropriately sized ears 52 may be utilized.

Referring again to FIGURE 2, it is seen that the ears 52 are situated between the extension 16 of the liner 14 and the mandrel 26. It is also seen that the outside diameter of the extension 16 is such that it will fit within the circle formed by the butted ears 52. Thus, with reference now to FIGURE 3, it is seen that upon further advancement of the mandrel 26, the extension 16 is flared outwardly between the mandrel 26 and the ears 52. The ears are held adjacent the mandrel by the springs 78, hereinafter described, with just enough clearance for the extension being flared. It is also seen that the ears 52 prevent the extension 16 from curling back upon itself and rolling into a bead, and instead forces the extension 16 to flow radially outwardly, as desired. Thus, as the heated mandrel advances on the liner 14, extension 16, the extension 16 is flared radially outwardly adjacent to the pipe flange 12.

As the mandrel 26 advances closer to the pipe flange 12, it is now apparent that the ears 52 must be removed so that the flared extension 16 may be seated against the pipe flange 12. Referring now to FIGURE 6, it is seen that the guides 56 are attached to the vertical plates 74 which are in turn slidably mounted on the rails 76, better seen in FIGURE 5. The rails 76 are in turn attached to the yoke 24. Also mounted on the rail 76 is a spring 78 which holds the ears 52 against the mandrel 26, as shown in FIGURE 3, when the mandrel advances on and flares the extension 16. Attached to the end plate 74 is a is a bracket 78 (FIGURE 5) which actuates the switch 80 upon being moved to the position shown in dotted lines as 78′. Thus, as the ears 52 and the flaring ear assembly 30 are moved adjacent the pipe flange 12, the bracket 78 moves to position 78′, thus actuating switch 80, which in turn energizes solenoid 70, thus allowing plunger 72 to pivot the stop bar 64 downwardly, thus releasing the slides 56 to move outwardly, thereby removing the ears 52 from between the mandrel 26 and the pipe flange 12. The actuation of the switch may be set for a clearance of approximately 1/16 in. between the ears 52 and the flange 12. It is now apparent that the controlling clearance is determined by the nature of the liner 14.

Referring now to FIGURE 4, it is seen that the ears 52 have been removed from between the mandrel 26, flared extension 16, and flange 12. Further, the mandrel has been pushed forward to a point wherein the flared extension 16 now rests against the conduit flange 12. At this position, the advancing means 32 is deactivated and the mandrel 26 allowed to cool, so that the flared extension 16 will take a thermoplastic set in its flared position. To hasten this cooling of the mandrel 26, a spray nozzle 82 may be utilized to spray a coolant upon the mandrel, thereby more quickly cooling the flared extension 16.

Thereupon, the mandrel may be withdrawn into the oven 28 and heated for flaring another extension, while the flared liner may be removed from the vice 18 and another conduit prepared for flaring.

In use, the conduit 10 with liner 14 and extension 16 extending therefrom is placed in the vice 18 and adjusted by the adjusting means 22 so that the mandrel 26 and extension 16 are coaxial. Thereupon, the heater 44 within the oven 28 is energized and the mandrel 26 is thus heated until the temperature sensing means 48 indicates that the proper temperature has been reached for flaring the thermoplastic liner extension 16. At this time, the door 50 is opened and the advancing means 32 is energized, thus advancing the heated mandrel 26 toward the extension 16.

As shown in FIGURE 2, the flaring ear assembly 30 is situated between the mandrel 26 and the extension 16 and in particular, the ears 52 are butted together so that they will fit about the extension 16. As the mandrel 26 advances upon the extension, the flaring ear assembly 30 is carried along with it, with the ears 52 spaced in front of the radial portion of the mandrel 26 enough to clear the extension. As the mandrel 26 begins to flare the extension 16 outwardly, as seen in FIGURE 3, the ears 52 prevent this flaring extension from curling back upon itself, and thus assure that the liner flares radially outwardly. When the flaring ear assembly 30 has advanced to such a position that the distance between the mandrel 26, flared extension 16 and pipe flange 12 is very close, and when the bracket 78 has moved to position 78′, the appropriate tripping mechanism is actuated, thus allowing the springs 60 to move the ears 52 outwardly so that the mandrel 26 may complete the flaring of the extension 16, as seen in FIGURE 4. The actual clearance is determined by the curling characteristics of the extension. Thereupon, the mandrel 26 is allowed to cool, such as by spraying with water from the nozzle 82, thus allowing the extension 16 to take a set against the conduit flange 12. The mandrel 26 may now be withdrawn into the oven 28, the conduit 10 removed from the vice 18, and the flaring ear assembly reset for another cycle.

The present invention, therefore, is well adapted to carry out the objects and attain the ends and advantages mentioned, as well as others inherent therein. While the presently preferred embodiment of the invention has been given for purpose of disclosure, numerous changes in the details of construction, and the combination, shape, size, arrangement of parts, and uses may be resorted to without departing from the spirit and scope of the invention as hereinafter claimed.

What is claimed is:

1. A spring loaded flaring ear assembly for use with a conduit liner flaring device including:
   a frame,
   a guide attached to the frame,
   a pair of slides slidably mounted on the guide,
   a collar attached to the guide between the slides,
   springs mounted on the guide yieldingly urging the slides apart and away from the collar,
   a releasable stop mounted on the frame and engagable with the slides,
   a semi-circular ear attached to each slide,
   the ears being butted together when the springs are compressed and the stop engages the slides,
   the ears being urged apart when the stop is released, and
   stop releasing means.

2. A liner flaring apparatus for flaring a conduit liner extension into contact with a conduit flange including:
   a radially extending mandrel,
   a vice holding the flanged conduit in coaxial alignment with the mandrel,
   coaxial advancing means for advancing the mandrel from a first position to a second position adjacent the conduit flange, an oven mounted to enclose the mandrel when in the first position,
an electrical heater in the oven,
temperature indicating means arranged to indicate the temperature of the mandrel when in the first position,
rails extending along the axis of the conduit,
vertical plates slidably mounted on the rails,
a guide interconnecting the plates,
slides mounted on the guide,
springs mounted on the guide urging the slides apart,
ears attached to the slides,
each ear including a substantially semicircular portion,
stops arranged to hold the slides against the springs,
the ears, when the stops engage the slides, forming a circle whose diameter is slidable over the conduit liner,
means for maintaining the ears adjacent and spaced from the mandrel as the mandrel is advanced, and
means for disengaging the stops when the ears are a predetermined distance from the conduit flange.

3. The invention of claim 2 wherein the disengaging means includes:
a solenoid mounted on the plates and arranged to disengage the stops,
a switch electrically connected to actuate the solenoid when the ears are a predetermined distance from the conduit flange.

4. A liner flaring apparatus for flaring a conduit liner extension into contact with a conduit flange including,
a mandrel,
means for holding the conduit in coaxial alignment with the mandrel,
mandrel heating means,
mandrel advancing means for advancing the mandrel into coaxial engagement with the liner extension,
back curl preventing means removably mounted adjacent and advanceable with the mandrel as the liner extension is flared,
said back curl preventing means comprising a pair of semi-circular ears arranged to encircle the liner extension,
said ears spaced from the mandrel toward the conduit flange,
means for removing the ears as the mandrel advances adjacent the conduit flange, and
means for advancing the mandrel to seat the flared liner extension on the conduit flange.

References Cited
UNITED STATES PATENTS

| | | |
|---|---|---|
| 1,661,367 | 3/1928 | Helminiak. |
| 3,076,228 | 2/1963 | Johnson _____ 18—19 |
| 3,142,868 | 8/1964 | Blount. |

WILLIAM J. STEPHENSON, *Primary Examiner.*